United States Patent [19]

Nakazawa

[11] Patent Number: 5,048,483
[45] Date of Patent: Sep. 17, 1991

[54] SYSTEM AND METHOD FOR CONTROLLING ENGINE REVOLUTIONS FOR VEHICULAR INTERNAL COMBUSTION ENGINE

[75] Inventor: Shinsuke Nakazawa, Kanagawa, Japan

[73] Assignee: Nissan Motor Company, Limited, Yokohama, Japan

[21] Appl. No.: 470,631

[22] Filed: Jan. 26, 1990

[30] Foreign Application Priority Data

Jan. 27, 1989 [JP] Japan .................................. 1-18695

[51] Int. Cl.$^5$ .......................... F02M 3/09; F02D 41/16
[52] U.S. Cl. ..................................................... 123/339
[58] Field of Search ................................ 123/339, 588

[56] References Cited

U.S. PATENT DOCUMENTS

| 4,385,603 | 5/1983 | Bonse et al. | 123/339 |
| 4,545,349 | 10/1985 | Ito et al. | 123/339 |
| 4,771,749 | 9/1988 | Kiuchi et al. | 123/339 |
| 4,856,475 | 8/1989 | Shimomura | 123/339 |

FOREIGN PATENT DOCUMENTS

| 61-15260 | 4/1986 | Japan . | |
| 62-50651 | 10/1987 | Japan . | |
| 0277834 | 11/1988 | Japan | 123/339 |
| 0182543 | 7/1989 | Japan | 123/339 |

Primary Examiner—Tony M. Argenbright
Assistant Examiner—Robert E. Mates
Attorney, Agent, or Firm—Foley & Lardner

[57] ABSTRACT

A system and method for controlling an engine revolution speed are disclosed in which upon a reduction in coolant temperature, a control signal is supplied to an idling control valve having a duty ratio reducing the duty ratio corresponding to the opening angle of the idling control valve when an engine coolant temperature is below a predetermined value so that during an engine deceleration in which an air regulator is open, an increase in a boost pressure is prevented and no reduction of the engine revolution speed occurs or engine revolution speed during the idling does not become excessively high.

10 Claims, 6 Drawing Sheets

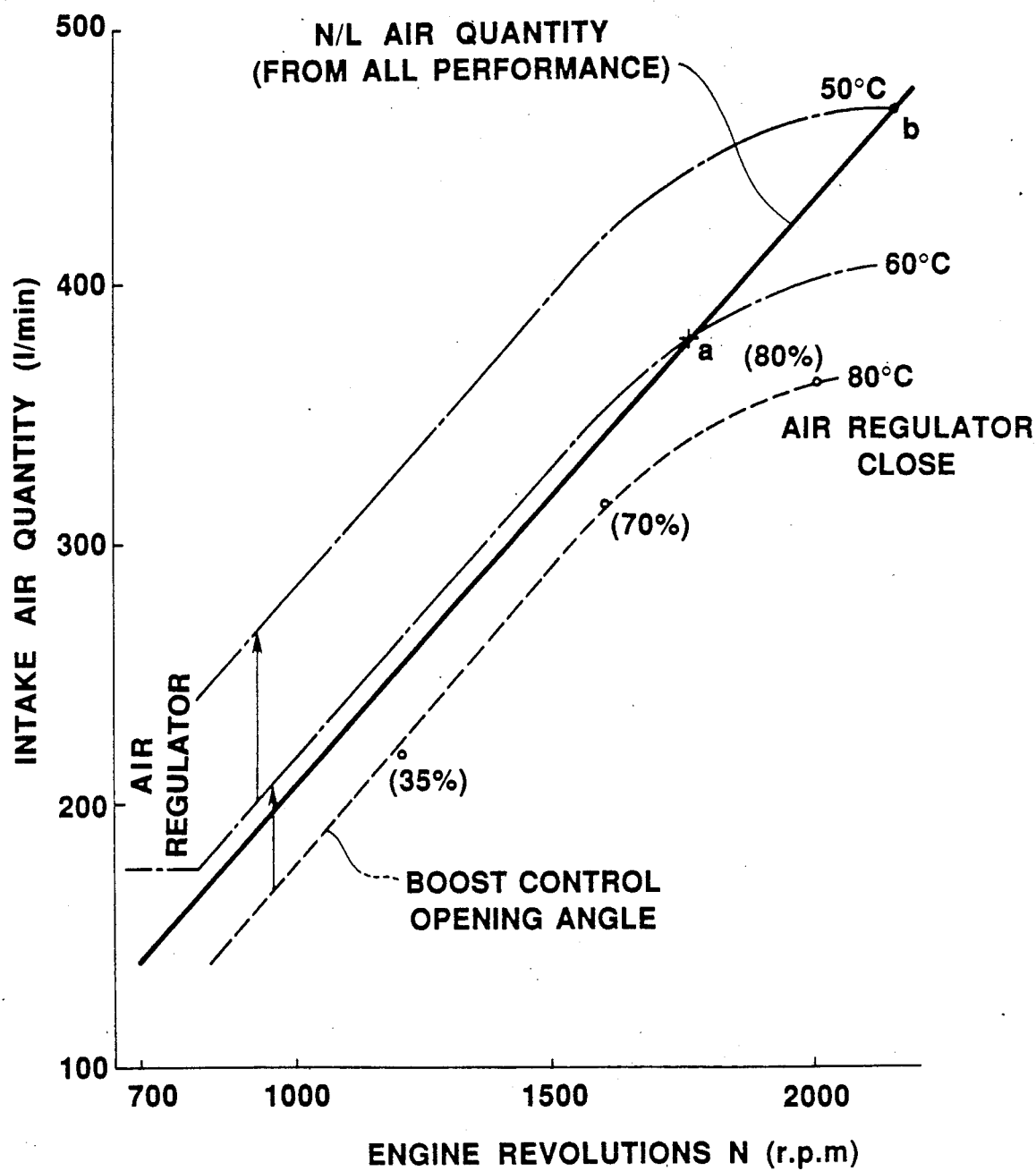

SYSTEM AND METHOD FOR CONTROLLING ENGINE REVOLUTIONS FOR VEHICULAR INTERNAL COMBUSTION ENGINE

BACKGROUND OF THE INVENTION (1) Field of the Invention

The present invention relates generally to a system and method for controlling engine revolutions for vehicular engines which carry out both the control of idling engine revolutions and boost pressure.

(2) Description of the Bakground Art

An engine revolution controlling system is previously proposed. in detail, an idling control valve which is driven by means of a control circuit is intervened in an auxiliary air passage bypassing a throttle valve of an engine.

An opening angle of the idling control valve controls an idling engine revolution to reach a target engine revolution. During engine deceleration, the idling control valve is opened such that an increase in an intake negative pressure (boost pressure) along with an abrupt close of the throttle valve results in an oil drop (leakage) from an intake and/or exhaust valve) can be prevented.

In addition, in such a previously proposed engine revolution controlling system as described above, an air regulator of a wax type is intervened in the auxiliary air passage whose opening angle is varied according to a temperature, in place of an idling control valve. Since the intake air quantity is increased according to a cooled state of the air regulator, an improvement in engine cranking and warmed up characteristics of the engine can be carried out.

The engine revolution controlling system as described above is exemplified by Japanese Patent Application Second Publication Showa, 61-15260 Published on Apr. 23, 1986, and the second Showa Japanese Patent Application Publication No. 62-50651, Published on Oct. 26, 1987.

In such a previously proposed engine revolution controlling system, when the engine deceleration condition is detected from the engine revolution speed and/or opening angle of the throttle valve, the idling control valve is widely opened such that an increase in the boost pressure can be prevented. In this case, to carry out the boost pressure control easily and with a good response characteristic, the idling control valve may previously be opened through a boost control opening angle which is determined according to the engine revolution speed.

However, although the prevention of an increase in the boost pressure can be achieved during the engine deceleration without sequential detection of the deceleration state, the engine revolution becomes increased more than necessary depending on a state of the air regulator.

That is to say, since the air regulator is opened during the cooling condition and the idling controlling valve is widely opened in such a state, the intake air quantity becomes too large. Therefore, in spite of the deceleration when driving, the engine revolution is not so reduced. In addition, even when the engine revolution is increased to some degree during the engine warm up, the idling control valve is accordingly opened. Thus, the idling revolution becomes considerably increased.

SUMMARY OF THE INVENTION

It is therefore an object of the present invention to provide a system and method for controlling an engine revolution speed for an internal combustion engine which provides an optimum boost control.

The above-described object can be achieved by providing a system for controlling an engine revolution for an internal combustion engine, comprising; an air regulator installed in a first air intake passage bypassing an engine throttle valve and which opens according to an engine warmed-up condition, an idling control valve, installed in a second air passage bypassing the throttle valve through which an engine idling speed control and boost pressure control are carried out in response to a control signal, first means for detecting a coolant water temperature, and second means for substracting a part of the control signal corresponding to the opening angle of the idling control valve based on the boost control from the control signal so as to suspend a boost control through the idling control valve when the coolant temperature is below a predetermined value.

The above-described object can also be achieved by providing a system for controlling engine revolutions for an internal combustion engine, comprising; an air regulator installed in a first auxiliary intake air passage bypassing a main intake air passage having an engine driving force adjusting mechanism, the air regulator opening the first passage according to an engine coolant temperature and closing the first passage when the engine coolant temperature is below a first predetermined value, an idling control valve installed in a second auxiliary intake air passage bypassing the engine throttle chamber, the idling control valve opening and closing the second intake air auxiliary passage according to a duty ratio of an input control signal, first means for detecting an engine operating condition including the engine coolant temperature, and second means for controlling a boost pressure and engine idling revolution speed through the idling control valve, the second means providing the control signal to the idling control valve having the duty ratio determined according to the engine operating condition and the duty ratio being determined only according to the coolant temperature so that the engine idling revolution speed is matched with a target engine idling speed when the engine coolant temperature is below a second predetermined value.

The above-described object can also be achieved by providing a method for controlling an engine revolution speed for an internal combustion engine, comprising the steps of; providing an air regulator in a first auxiliary intake air passage bypassing an engine throttle chamber, the air regulator opening the first passage according to an engine coolant temperature and closing the first passage when the engine coolant temperature is below a first predetermined value, providing an idling control valve in a second auxiliary intake air passage bypassing the engine throttle chamber, the idling control valve opening and closing the second intake air auxiliary passage according to a duty ratio of an input control signal, detecting an engine operating condition including the engine coolant temperature, and controlling a boost pressure and engine idling revolution speed through the idling control valve and providing the control signal to the idling control valve having the duty ratio determined according to the engine operating condition and the duty ratio being determined only according to the coolant temperature so that the engine idling revolution speed is matched with a target engine idling speed when the engine coolant temperature is below a second predetermined value.

BRIEF DESCRIPTION OF THE DRAWINGS

FIGS. 6 and 7 are characteristic graphs of the engine in a prior art engine revolution speed controlling system.

DETAILED DESCRIPTION OF THE PREFERRED EMBODIMENTS

Reference will hereinafter be made to the drawings in order to facilitate a better understanding of the present invention.

Figure 1:
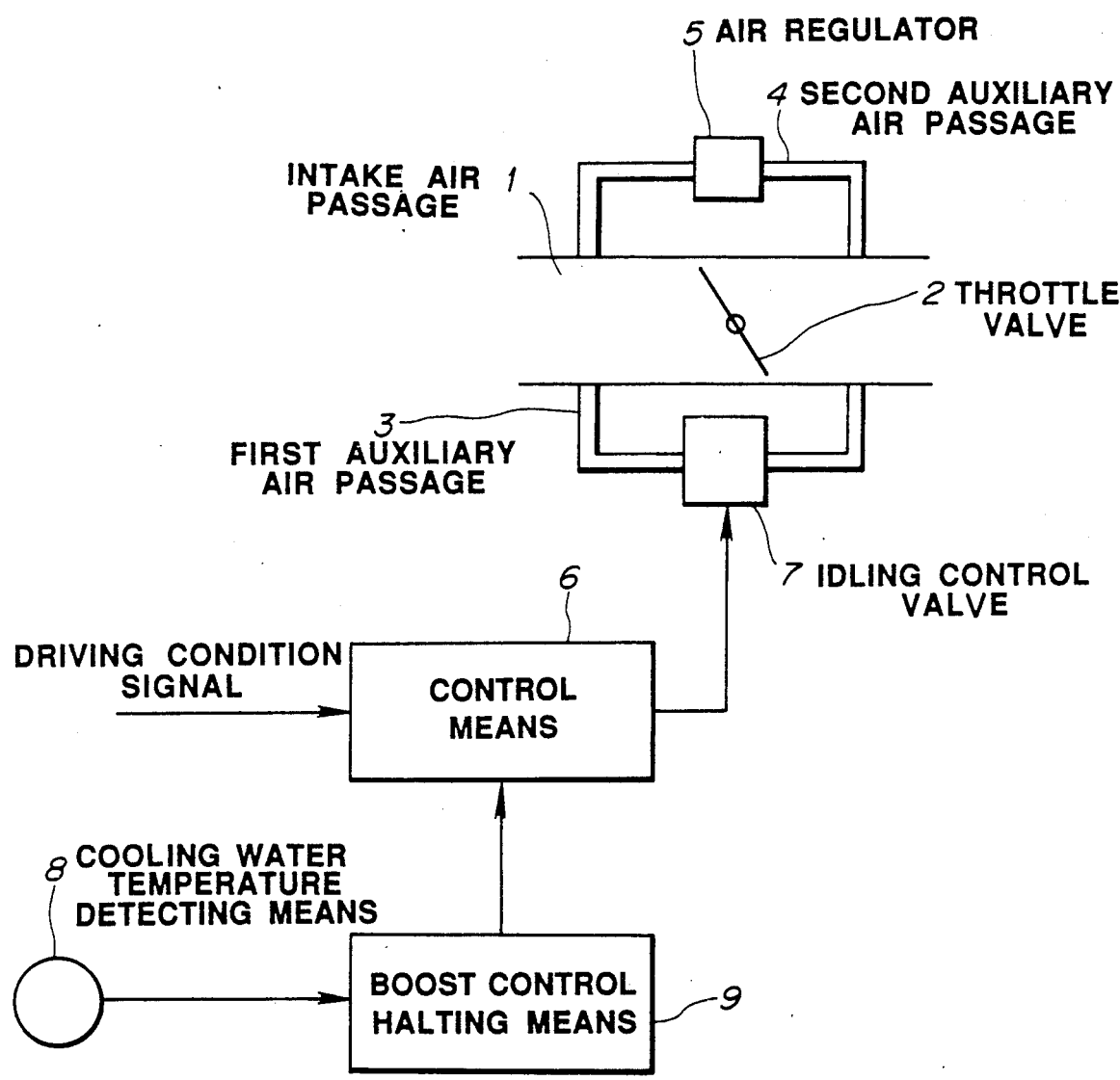
FIG. 1 is a functional block diagram of a system for controlling an engine revolution speed for an internal combustion engine.

FIG. 1 shows a functional block diagram of a system for controlling an engine revolution speed.

As illustrated in FIG. 1, an air regulator 5 is installed in one of auxiliary air passages 3, 4, bypassing the throttle valve 2 of the intake air passage 1. An idling control valve 7 is intervened which performs an idling revolution control and boost control, an opening angle being controlled by a signal derived from controlling means 6.

Means 8 is provided for detecting a cooling water temperature of the engine. When the cooling water temperature is below a predetermined value, an opening angle based on the boost control is decreased by means 9 such that the boost control is suspended by means of idling control valve 7 which is installed.

Figure 2:
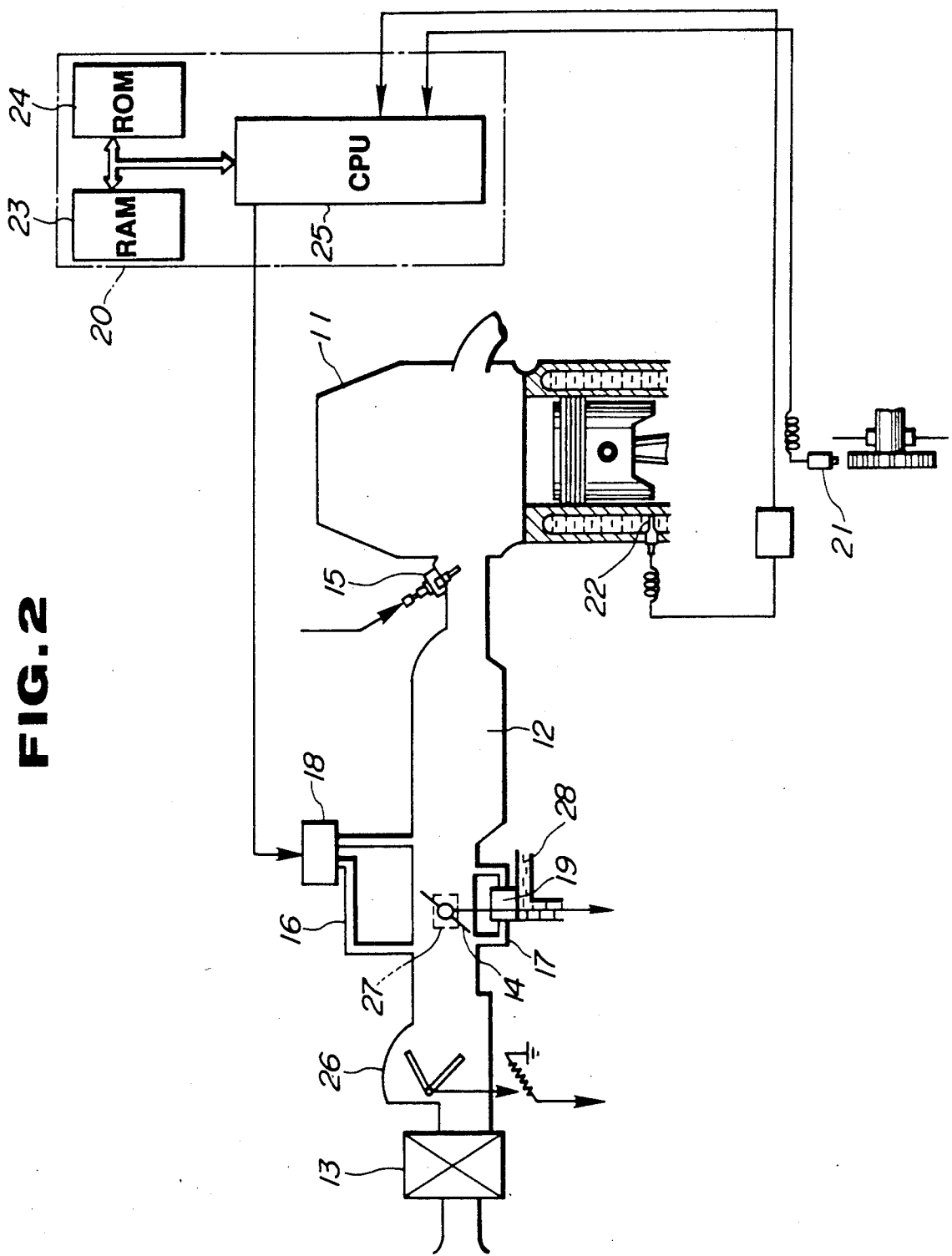
FIG. 2 is a specific circuit block diagram of a preferred embodiment of a system for controlling an engine revolution speed for an internal combustion engine.

FIG. 2 shows a circuit block diagram of the engine revolution speed controlling system in a preferred embodiment according to the present invention.

As shown in FIG. 2, an engine main body 11 includes an intake air passage 12, an air cleaner 13, a throttle valve 14, and fuel injection valve 15.

A first auxiliary air passage 16 and second auxiliary air passage 17 introduces intake air bypassing a throttle valve 14, the first auxiliary air passage 16 having an idling control valve 18 and the second auxiliary air passage 17 having the air regulator 19.

The idling control valve 18 includes an electromagnetic valve and is driven in response to a duty signal derived from a control unit 20. The air regulator 19 opens as the cooling water temperature becomes reduced in response to the cooling water temperature in a coolant passage 28 of the engine. When the coolant temperature exceeds a predetermined value, the coolant passage exceeding the predetermined value is closed.

In addition, a crank angle sensor 21 detects the number of engine revolutions, a coolant temperature sensor 22 detects a coolant water of the engine 11. These signals are transmitted to a control unit generally denoted by 20.

The control unit 20 includes a microcomputer having a CPU (Central Processing Unit) 23, a memory 24, and interface 25.

A duty signal is outputted to the idling control valve 18 on the basis of each signal so that a time ratio of opening the idling control valve 18 (opening angle) is controlled.

An airflow sensor 26 detects an intake air quantity of the engine and an opening angle sensor 27 detects an opening angle of a throttle valve 14.

Figure 3:
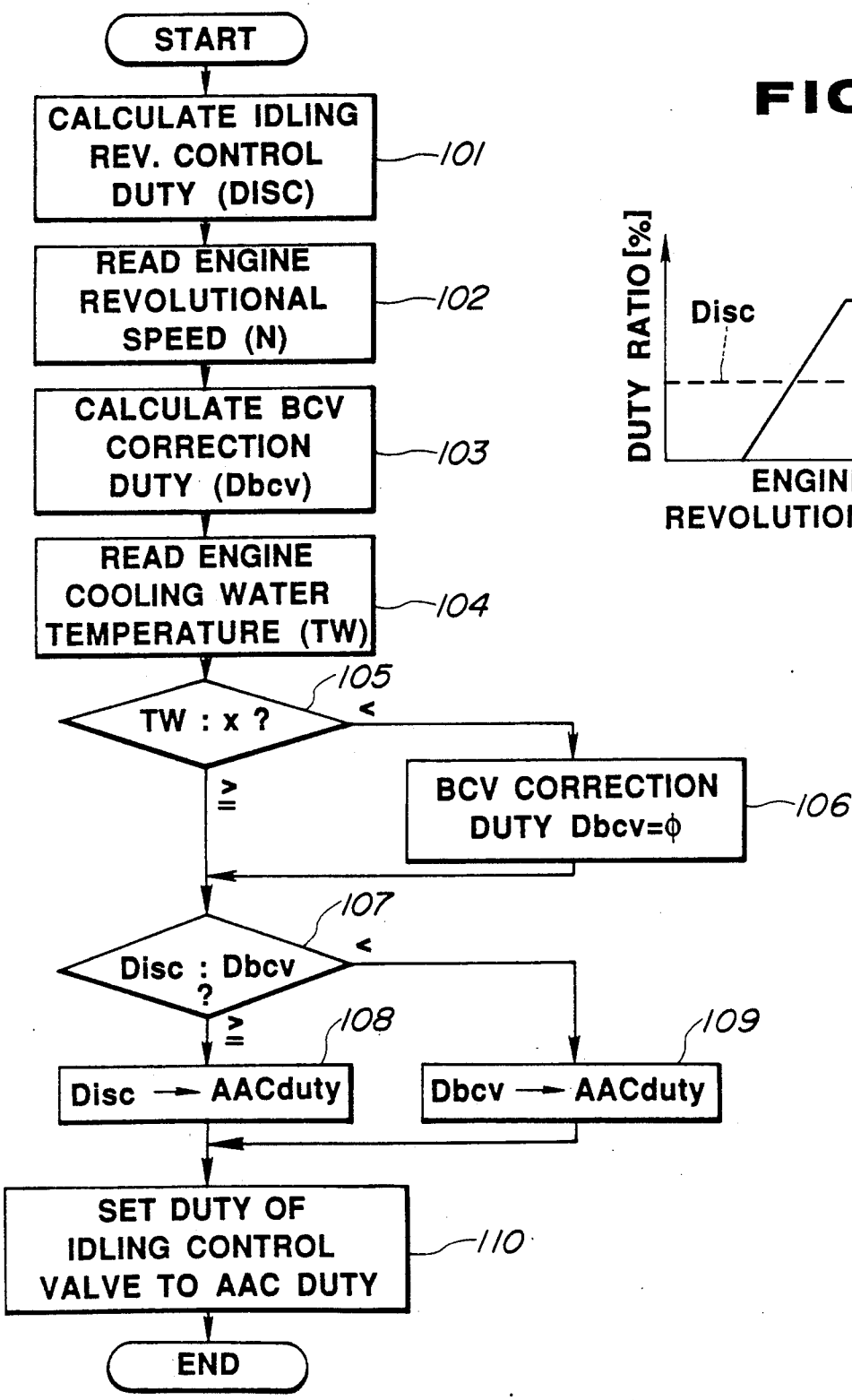
FIGS. 3 and 4 are operational flowcharts setting examples of a duty ratio of a control signal provided in the engine revolution speed controlling system shown in FIG. 2.

The control contents executed by a control unit 20 will be explained with reference to a flowchart of FIG. 3.

First, in steps 101 through 104, an idling control duty value (Disc) of the idling control valve 18 is calculated with respect to the idling revolution control and a boost control duty ratio or BCD correction duty value known as Dbcv, of the idling control valve 18 with respect to a boost control are calculated.

The idling control duty value (Disc) is used to control the idling engine revolution speed to reach a target revolution speed and is set according to the cooling water temperature and used conditions of accessories such as an air conditioner, and so on.

Figure 4:
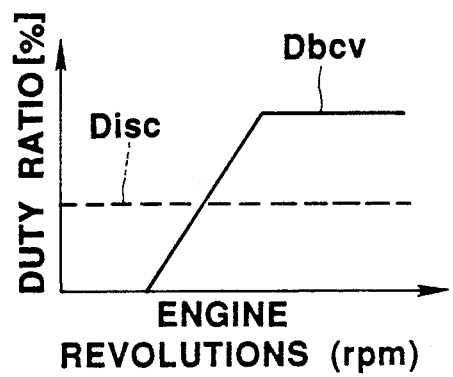

The BCD correction duty (Dbcv) is used to prevent the increase in the boost pressure during engine deceleration. In this case, the BCD correction duty (Dbcv) is set according to the engine revolution speed, as shown in FIG. 4.

In steps 105 and 106, the coolant temperature Tw is compared with a predetermined value x. When the coolant temperature Tw is below a predetermined value (during the warm up), the BCD correction duty value Dbcv derived in a step 103 is cleared to 0.

In steps 107 through 110, the idling control duty value Disc and BCD correction duty value Dbcv are compared. According to the larger duty value, the duty singal AACduty output to the idle control valve 18 is determined.

The idling control valve 18 is controlled so as to always provide an optimum opening angle according to the engine driving condition.

That is to say, during the engine idling, the idling control valve 18 is set according to the coolant temperature and used state of the air conditioner.

The opening angle is controlled according to the duty signal AACduty based on the idling control duty value Disc set according to the cooling water temperature and used state of the air conditioner.

When the cooling water temperature is higher than a predetermined value and air regulator 19 is closed, the intake air introduced via the idling control valve 18 causes the engine revolution speed to be controlled to arrive at the predetermined target engine revolution speed.

Therefore, in a state in which the coolant temperature is lower than the predetermined value and air regulator 19 is opened, the intake air introduced via the idling control valve 18 and air regulator 19 causes the engine revolution speed to be controlled at a predetermined target idling revolution speed.

On the other hand, as the engine revolution speed is raised from the idling condition, the opening angle of the idling control valve 18 is controlled according to the duty ratio signal AACduty based on the BCD correction duty value Dbcv (refer to FIG. 4) taking a larger value than the idling control duty value Disc. Therefore, as the deceleration driving is carried out, the increase in the boost pressure by means of the largely opened idling control valve 18 can assuredly be prevented.

Figure 5:
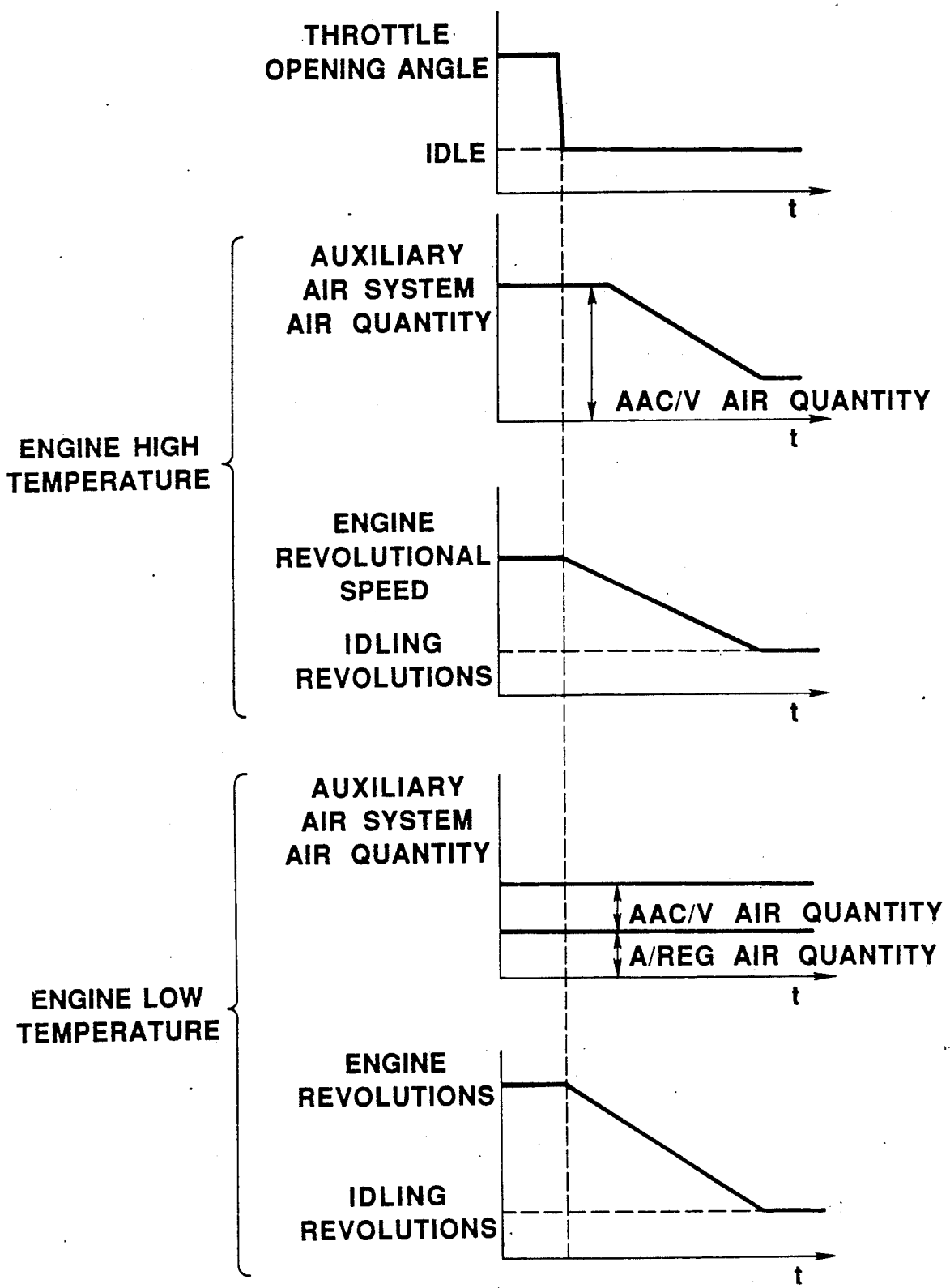
FIG. 5 is a characteristic graph of the engine in the engine revolution speed controlling system during an engine deceleration.

As the engine revolutions are reduced, as shown in FIG. 5, the opening angle of the idling control valve 18 is reduced and the intake air quantity passing through the idling control valve 18 is reduced. Therefore, the engine revolution speed is smoothly reduced.

On the other hand, when, as the engine revolution speed is increased from the idling state, the cooling water temperature is lower than the predetermined value, the BCD correction duty ratio Dbcv is cleared to 0. At this time, the opening angle of the idling control valve 18 is controlled according to the duty ratio AAC-duty based on the above-described idling control duty value Disc.

That is to say, the idling control valve 18 is held toward a predetermined idling opening angle.

When the deceleration driving is carried out under the cooled condition, the air regulator 19 is opened according to the cooling water temperature and prevents an increase in the boost pressure.

Since the intake air quantity is not increased due to the idling control valve 18, the engine revolution speed is smoothly reduced at the idling revolution speed.

Figure 6:
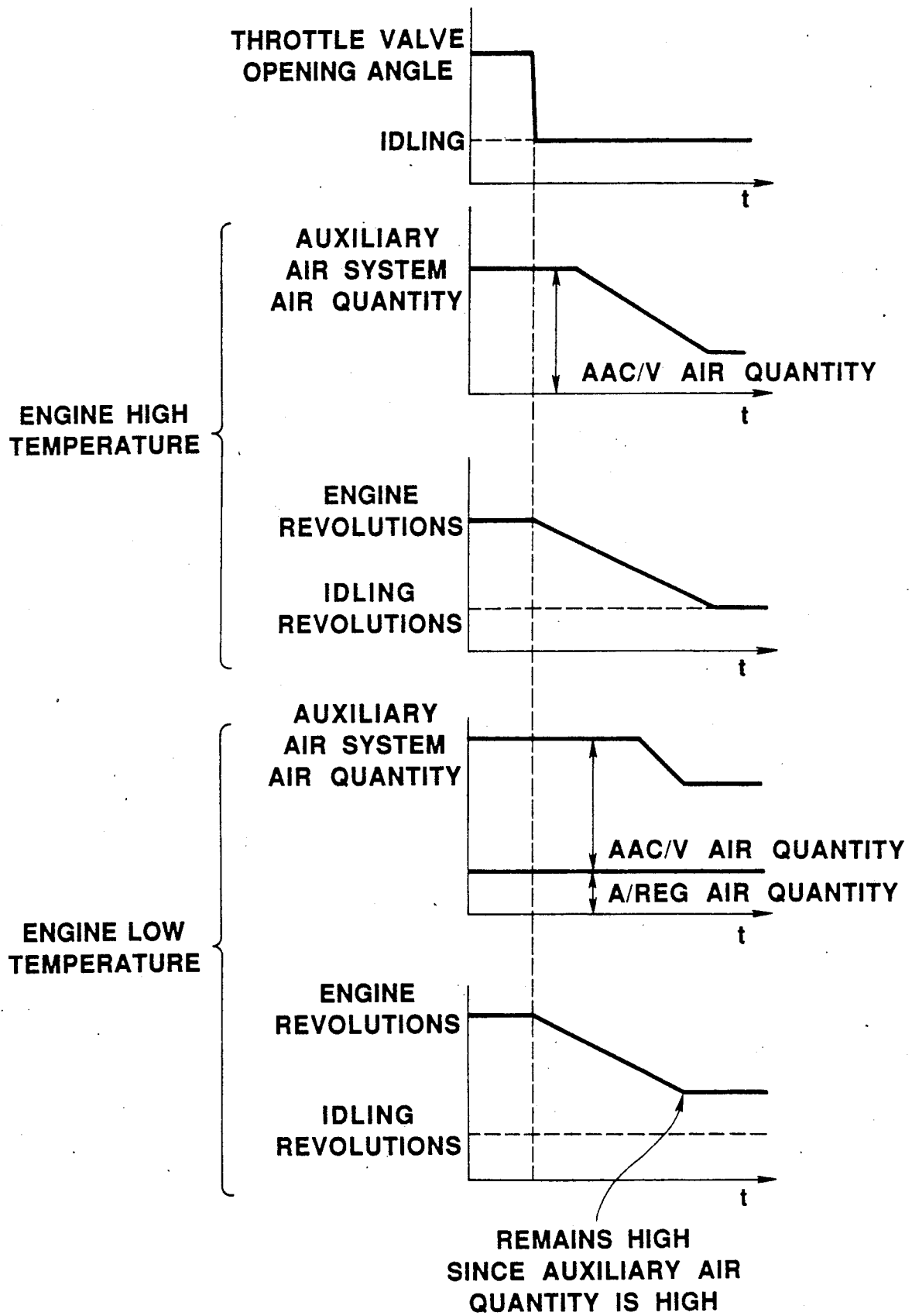

As in the previously proposed engine revolution speed controlling system, when the idling control valve 18 is opened through an angle exceeding the idling opening angle according to the engine revolution speed, the intake air quantity introduced via the air regulator 19 and intake air quantity introduced via the idling control valve 18 contribute to an excessive amount of intake air. Consequently, the idling revolutions become considerably high as shown in FIG. 6 even if the engine falls in the idling condition.

For example, as the cooling water temperature indicates 60° C., the engine revolution speed indicates 1750 rpm (point a) when the cooling water temperature is 60° and the engine revolution speed indicates 2150 rpm (point b) when the cooling water temperature indicates 50°.

Therefore, although a different feeling is given to the driver, the idling control valve 18 cannot be opened by an angle wider than an angle exceeding the idling opening angle so that appropriate idling revolutions can be maintained.

As described hereinabove, since the means for detecting the engine cooling water temperature and means for suspending the boost control caused by the idling control valve and by reducing the opening angle of the idling control valve when the cooling water temperature is below the predetermined value, an appropriate idling revolution can always be maintained in spite of the cooling condition. A preferable deceleration state can be assured preventing the increase in the boost pressure during the deceleration.

It will fully be appreciated by those skilled in the art that the foregoing description is made in terms of the preferred embodiments and various changes and modifications may be made without departing from the spirit and of the present invention.

What is claimed is:

1. A system for controlling an engine revolution for an internal combustion engine, comprising:
   a) an air regulator installed in a first air intake passage bypassing an engine throttle valve and which opens according to an engine warmed-up condition;
   b) an idling control valve, installed in a second air passage bypassing the throttle valve, through which an engine idling speed control and boost pressure control are carried out in response to a control signal;
   c) first means for detecting a coolant water temperature; and
   d) second means for subtracting a part of the control signal corresponding to the opening angle of the idling control valve based on the boost control from the control signal so as to suspend the boost control through the idling control valve when the coolant temperature is below a predetermined value.

2. A system as set forth in claim 1, which further includes:
   e) third means for calculating an idling control duty ratio value Disc for the idling revolution speed control and calculating a boost control duty correction duty ration value Dbcv of the idling control valve for the idling control;
   f) fourth means for comparing the idling control duty ratio value Disc with the boost control duty correction duty ratio value Dbcv and providing the control signal for the idling control valve, the control signal having the duty ratio corresponding to the larger of the idling control duty ratio value Disc and boost control duty correction duty ratio value Dbcv; and
   g) fifth means for clearing the boost control duty correction duty ratio value Dbcv to zero when the coolant temperature is below the predetermined value.

3. A system for controlling an engine revolution as set forth in claim 2, further comprising an engine revolution speed sensor for detecting the engine revolution speed, and wherein the boost control duty correction duty ratio value Dbcv is set according the engine revolution speed.

4. A system for controlling an engine revolution as set forth in claim 3, wherein the idling control duty ratio value Disc is set according to the coolant temperature and used state of an accessory of the engine.

5. A system for controlling engine revolutions for an internal combustion engine, comprising:
   a) an air regulator installed in a fist auxiliary intake air passage bypassing a main engine intake air passage having an engine driving force adjusting mechanism, the air regulator opening the first passage according to an engine coolant temperature and closing the first passage when the engine coolant temperature is above a first predetermined value;
   b) an idling control valve installed in a second auxiliary intake air passage bypassing the engine throttle chamber, the idling control valve opening and closing the second intake air auxiliary passage according to a duty ratio of an input control signal;
   c) first means for detecting an engine operating condition including the engine coolant temperature; and
   d) second means for controlling a boost pressure and engine idling revolution speed through the idling control valve, the second means providing the control signal to the idling control valve having the duty ratio determined according to the engine operating condition and the duty ratio being determined only according to the coolant temperature so that the engine idling revolution speed is matched with a target engine idling speed when the engine coolant temperature is below a second predetermined value.

6. A system as set forth in claim 5, wherein the first predetermined value equals the second predetermined value.

7. A system as set forth in claim 6, wherein the duty ratio of the control signal includes an idling revolution control duty ratio Disc for controlling the idling control valve so that the engine idling speed coincides with the target idling speed and a boost control duty correction duty ratio Dbcv for the control of the boost pressure.

8. A system as set forth in claim 7, wherein the boost control duty correction duty ratio Dbcv is cleared to zero when the coolant temperature is below the second predetermined value.

9. A system as set forth in claim 8, wherein the first means includes third means for detecting an engine revolution speed and forth means for detecting an engine deceleration state and wherein the boost control duty correction duty ratio Dbcv is increased as the engine revolution speed is increased.

10. A method for controlling an engine revolution speed for an internal combustion engine, comprising the steps of:

a) providing an air regulator in a first auxiliary intake air passage bypassing an engine throttle chamber, the air regulator opening the first passage according to an engine coolant temperature and closing the first passage when the engine coolant temperature is above a first predetermined value;

b) providing an idling control valve in a second auxiliary intake air passage bypassing the engine throttle chamber, the idling control valve opening and closing the second intake air auxiliary passage according to a duty ratio of an input control signal;

c) detecting an engine operating condition including the engine coolant temperature, and d) controlling a boost pressure and engine idling revolution speed through the idling control valve and providing the control signal to the idling control valve having the duty ratio determined according to the engine operating condition and the duty ratio being determined only according to the coolant temperature so that the engine idling revolution speed is matched with a target engine idling speed when the engine coolant temperature is below a second predetermined value.

* * * * *